US011624621B2

(12) United States Patent
Freese et al.

(10) Patent No.: US 11,624,621 B2
(45) Date of Patent: Apr. 11, 2023

(54) RE-ROUTING CONTEXT DETERMINATION

(71) Applicant: TOYOTA MOTOR NORTH AMERICA, INC., Plano, TX (US)

(72) Inventors: Christian Freese, Plano, TX (US); Seyhan Ucar, Plano, TX (US); Equan Tompkins, Aubrey, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 379 days.

(21) Appl. No.: 16/442,237

(22) Filed: Jun. 14, 2019

(65) Prior Publication Data
US 2020/0393255 A1 Dec. 17, 2020

(51) Int. Cl.
*G01C 21/34* (2006.01)

(52) U.S. Cl.
CPC ..... *G01C 21/3415* (2013.01); *G01C 21/3484* (2013.01); *G01C 21/3492* (2013.01)

(58) Field of Classification Search
CPC ........................ G08G 1/096805; G08G 1/0968
See application file for complete search history.

(56) References Cited

U.S. PATENT DOCUMENTS

| | | | | |
|---|---|---|---|---|
| 8,024,114 B2 * | 9/2011 | Doyle | ............... | G08G 1/096811 701/417 |
| 8,606,511 B2 * | 12/2013 | Johnson | ............. | G01C 21/3415 701/414 |
| 9,228,845 B2 * | 1/2016 | Nomoto | ................. | G01C 21/26 |
| 9,664,525 B2 * | 5/2017 | Dimitriadis | ........ | G01C 21/3664 |
| 9,836,963 B1 * | 12/2017 | Hayward | ............... | B60W 40/10 |
| 9,989,369 B2 * | 6/2018 | Glasgow | ................. | G01S 19/13 |
| 10,102,744 B2 * | 10/2018 | Dhondse | ............. | G08G 1/0116 |
| 10,228,271 B2 * | 3/2019 | Jenkins | ............. | G01C 21/3641 |
| 2005/0065711 A1 * | 3/2005 | Dahlgren | ......... | G08G 1/096775 701/117 |
| 2007/0027614 A1 * | 2/2007 | Reeser | ..................... | G08G 1/20 701/420 |
| 2009/0024320 A1 * | 1/2009 | Nakamura | ....... | G08G 1/096844 701/414 |
| 2010/0256903 A1 * | 10/2010 | Johnson | ............. | G01C 21/3415 701/533 |
| 2011/0098915 A1 * | 4/2011 | Disatnik | ............ | G01C 21/3415 701/533 |
| 2015/0253141 A1 * | 9/2015 | Kesting | .................. | G01C 21/30 701/409 |
| 2016/0189010 A1 * | 6/2016 | Tang | ..................... | G06K 9/627 382/113 |

(Continued)

*Primary Examiner* — Jelani A Smith
*Assistant Examiner* — Jacob Daniel Underbakke
(74) *Attorney, Agent, or Firm* — Sheppard, Mullin, Richter & Hampton LLP; Hector A. Agdeppa; Daniel N. Yannuzzi

(57) ABSTRACT

Systems and methods are provided for vehicle re-routing context determination for a subject vehicle, including: tracking movement of the subject vehicle as the subject vehicle is following a planned route; determining whether a deviation of the subject vehicle from the planned route indicates a user-initiated re-routing of the subject vehicle from the planned route; gathering data from a plurality of sources indicating a route condition leading to the user-initiated re-routing; analyzing the gathered data to determine a reason for the user-initiated re-routing; and based on the reason, determining whether to reroute other vehicles to avoid the reason for the user-initiated re-routing.

21 Claims, 7 Drawing Sheets

(56) References Cited

U.S. PATENT DOCUMENTS

| | | | |
|---|---|---|---|
| 2016/0334230 A1* | 11/2016 | Ross | G01C 21/3415 |
| 2016/0349066 A1* | 12/2016 | Chung | G01C 21/3658 |
| 2016/0355182 A1* | 12/2016 | Remillard | G01C 21/3415 |
| 2017/0138744 A1* | 5/2017 | Jaquinta | G01C 21/3415 |
| 2017/0192423 A1* | 7/2017 | Rust | G01C 21/3492 |
| 2017/0276495 A1* | 9/2017 | Krishnan | G08G 1/096741 |
| 2017/0370736 A1* | 12/2017 | Singh | G01C 21/3484 |
| 2018/0003516 A1* | 1/2018 | Khasis | G08G 1/207 |
| 2018/0094943 A1* | 4/2018 | Grochocki, Jr. | G01C 21/3415 |
| 2018/0100746 A1* | 4/2018 | Jenkins | G01C 21/3415 |
| 2018/0184245 A1* | 6/2018 | Park | H04W 4/023 |
| 2018/0237012 A1* | 8/2018 | Jammoussi | H04W 4/46 |
| 2018/0268359 A1* | 9/2018 | Soubhagya | G01C 21/26 |
| 2018/0276988 A1* | 9/2018 | Littlejohn | G08G 1/0116 |
| 2018/0284758 A1* | 10/2018 | Cella | G01M 13/028 |
| 2018/0297518 A1* | 10/2018 | Armitage | G07C 5/008 |
| 2018/0309592 A1* | 10/2018 | Stolfus | G08G 1/0969 |
| 2018/0328745 A1* | 11/2018 | Nagy | G01C 21/32 |
| 2019/0019409 A1* | 1/2019 | Farr | G08G 1/0965 |
| 2019/0049262 A1* | 2/2019 | Grimm | G07C 5/008 |
| 2019/0086918 A1* | 3/2019 | Angenendt | B60W 30/00 |
| 2019/0102668 A1* | 4/2019 | Yao | G05B 17/02 |
| 2021/0042670 A1* | 2/2021 | Hirose | G01C 21/3438 |

* cited by examiner

RE-ROUTING CONTEXT DETERMINATION

TECHNICAL FIELD

The present disclosure relates generally to vehicle routing, and in particular, some implementations may relate to propagating re-routing decisions based on a re-routing context determination.

DESCRIPTION OF RELATED ART

For centuries, navigation has presented a problem to travelers seeking to venture from one destination to another. Early navigation techniques included observing landmarks to determine present locations and direction of travel. Such techniques are ineffective on the open seas, so early travelers resorted to celestial navigation, using the angle of celestial bodies such as the sun, other stars and planets, to obtain a fix on a vessel's location. The sextant provided a means by which early navigators estimated latitude on the open seas. The addition of accurate timepieces, capable of maintaining time over long duration and in rough seas, added the ability to estimate longitude as well.

Fast forward to today, and modern GPS-based and similar navigation systems are ubiquitous in modern society. These position-determination systems may use satellite, cell tower, or other triangulation to obtain a fix on a vehicle's position. Not only do they determine position, but they are also able to calculate routes to a given destination and present those routes to a vehicle operator via a user interface. Contemporary systems may use external data such as traffic data, as well as user preferences (e.g., fastest route, shortest route, no toll roads, etc.) to select a preferred route.

However calculated or selected, the preferred route is presented to a vehicle operator via a user interface so that the operator can direct the vehicle along the desired route to its destination. The selected route may also be fed to autonomous vehicles such that the vehicle can autonomously travel to the desired destination along the identified route. Third party information such as real-time traffic information, may be used by the systems to automatically reroute a vehicle or to give the operator the option to reroute based on the occurrence of the event.

BRIEF SUMMARY OF THE DISCLOSURE

Embodiments of the systems and methods disclosed herein can provide re-routing context determination in the event a vehicle is rerouted from a plotted navigation route. Particularly embodiments may be configured to determine the context in which the re-routing was initiated (e.g., a reason for the re-routing), and based on the context, determine whether to make and propagate a re-routing decision to other vehicles following the same or similar route. For example, the system may determine whether the cause for a re-routing event will likely affect other vehicles and if so, determine how the other vehicles may be rerouted in view of that cause.

In one embodiment, a method for re-routing context determination for a subject vehicle, may include: tracking movement of the subject vehicle as the subject vehicle is following a planned route; determining whether a deviation of the subject vehicle from the planned route indicates a user-initiated re-routing of the subject vehicle from the planned route; gathering data from a plurality of sources indicating a route condition leading to the user-initiated re-routing; analyzing the gathered data to determine a reason for the user-initiated re-routing; and based on the reason, determining whether to reroute other vehicles to avoid the reason for the user-initiated re-routing. In various embodiments, the sources of gathered data comprise at least one of services, infrastructure elements, vehicle systems and other vehicles.

The method may further include analyzing some or all of the gathered data to predict a clearing time of a route condition that is determined to have given rise to the driver-initiated re-routing event. In various embodiments, analyzing the gathered data to determine a context for the user-initiated re-routing, may include predicting a re-routing reason based on a trained data set.

In various embodiments, gathering data is performed only if the deviation of the subject vehicle from the plotted route is a re-routing event.

In various embodiments, determining whether the deviation of the subject vehicle from the planned route indicates a user-initiated re-routing of the subject vehicle from the planned route is performed by at least one of the subject vehicle and a server remote from the vehicle. Determining the reason for the user-initiated re-routing may be performed by the server remote from the vehicle.

In some embodiments, the subject vehicle is not connected to a remote server and In various embodiments, determining whether the deviation of the subject vehicle from the planned route indicates a user-initiated re-routing of the subject vehicle from the planned route is performed by a plurality of one or more connected vehicles connected to a remote server to determine a likelihood that the deviation is a user-initiated re-routing. Determining a likelihood that the deviation is a user initiated re-routing may include determining whether route activity of a subject vehicle is anomalous route activity.

In further embodiments, a rerouting system, may include: a processor; and a memory coupled to the processor to store instructions, which when executed by the processor, cause the processor to perform operations, the operations comprising: tracking movement of the subject vehicle as the subject vehicle is following a planned route; determining whether a deviation of the subject vehicle from the planned route indicates a user-initiated re-routing of the subject vehicle from the planned route; gathering data from a plurality of sources indicating a route condition leading to the user-initiated re-routing; analyzing the gathered data to determine a reason for the user-initiated re-routing; and based on the reason, determining whether to reroute other vehicles to avoid the reason for the user-initiated re-routing. In various embodiments, the sources of gathered data comprise at least one of services, infrastructure elements, vehicle systems and other vehicles.

The system may further include analyzing some or all of the gathered data to predict a clearing time of a route condition that is determined to have given rise to the driver-initiated re-routing event.

In various embodiments, analyzing the gathered data to determine a reason for the user-initiated re-routing, may include predicting a re-routing reason based on a trained data set.

The system may further include using artificial intelligence to determine previously unrecognized re-routing reasons based on gathered data.

In various embodiments, gathering data is performed only if the deviation of the subject vehicle from the plotted route is a re-routing event.

A rerouting system to determine a rerouting reason for a subject vehicle, may include: a monitoring vehicle tracking movement of the subject vehicle as the subject vehicle is following a route; the monitoring vehicle determining whether a change in routing indicates a user-initiated re-routing of the subject vehicle from a planned route; a rerouting server gathering data from a plurality of sources indicating a route condition leading to the user-initiated re-routing; analyzing the gathered data to determine a reason for the user-initiated re-routing; and based on the reason, determining whether to reroute other vehicles to avoid the reason for the user-initiated re-routing. Determining whether a change in routing indicates a user initiated rerouting of the subject vehicle from a planned route may include the monitoring vehicle evaluating sensor data to determine a likelihood that the change in routing is an anomalous route activity.

A method for rerouting determination among a plurality of vehicles in communication with one another, may include: a first vehicle of the plurality of vehicles sending a notification to at least one of the other vehicles of the plurality of the vehicles that the first vehicle is deviating from a planned route; the other vehicles of the plurality of vehicles gathering data from a plurality of sources indicating a route condition, and analyzing the gathered data to determine a reason the first vehicle is deviating from the planned route; and the other vehicles, based on the reason, determining whether to reroute themselves to avoid the reason for the rerouting. In various embodiments, the data gathered from the plurality of sources may include at least one of data gathered from sensors onboard the other vehicles, services and infrastructure elements.

A system for rerouting determination among a plurality of vehicles in communication with one another, may include: the plurality of vehicles receiving a notification from a subject vehicle indicating that the subject vehicle is deviating from a planned route; the plurality of vehicles gathering data from a plurality of sources indicating a route condition, and analyzing the gathered data to determine a reason the subject vehicle is deviating from the planned route; and the other vehicles, based on the reason, determining whether to reroute themselves to avoid the reason for the rerouting. In various embodiments, the data gathered from the plurality of sources may include at least one of data gathered from sensors onboard the other vehicles, services and infrastructure elements.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
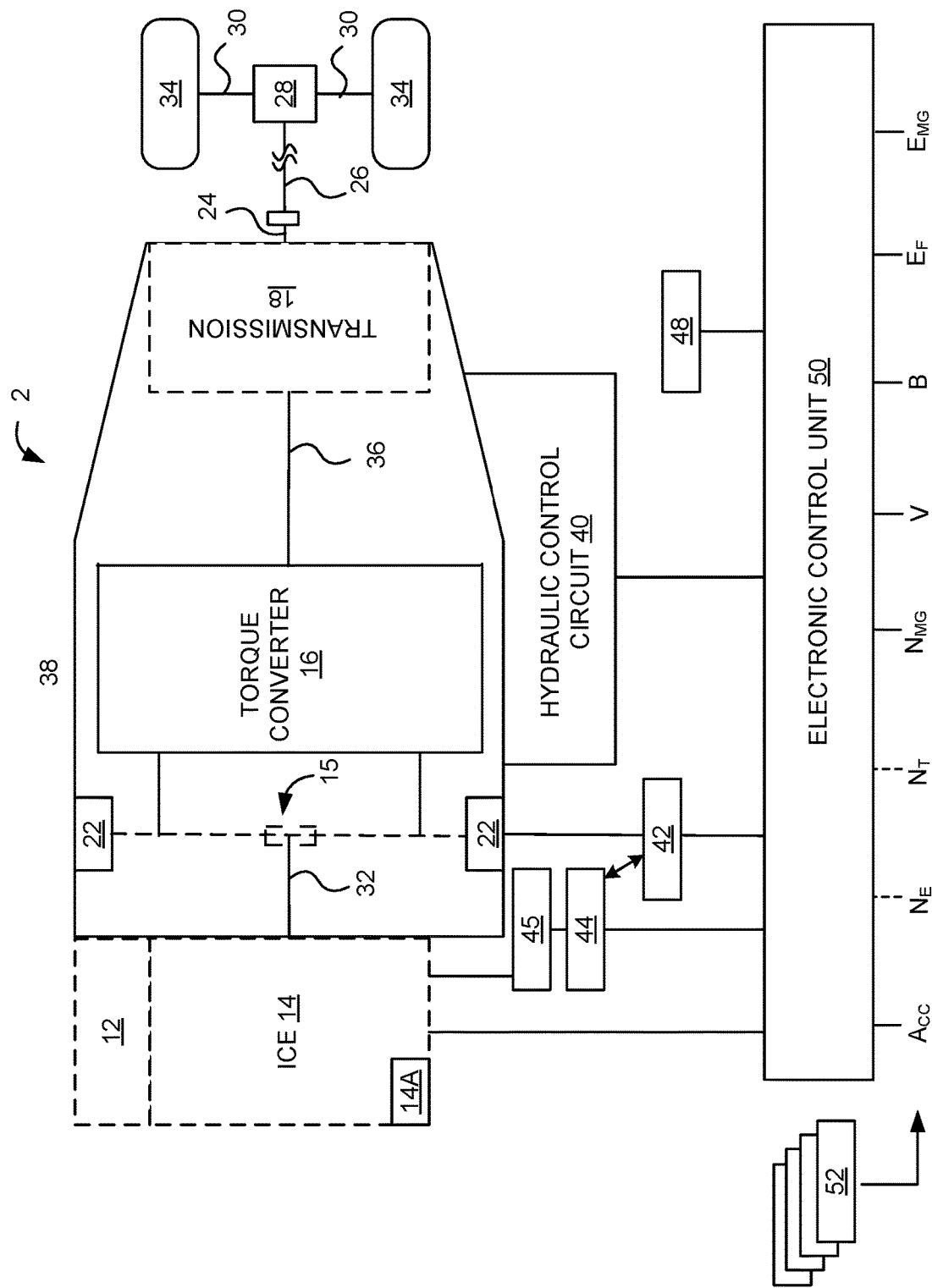
FIG. 1 is a schematic representation of an example vehicle with which embodiments of the systems and methods disclosed herein may be implemented.

The figures are not exhaustive and do not limit the present disclosure to the precise form disclosed.

DETAILED DESCRIPTION

Embodiments of the systems and methods disclosed herein can provide re-routing context determination in the event a vehicle is rerouted from a plotted navigation route. Particularly embodiments may be configured to determine the context in which the re-routing was initiated (e.g., a reason for the re-routing), and based on the context, determine whether to make and propagate a re-routing decision to other vehicles following the same or similar route. For example, the system may determine whether the cause for a re-routing event will likely affect other vehicles and if so, determine how the other vehicles may be rerouted in view of that cause. New routes can be computed for the other vehicles and propagated to those vehicles.

In various implementations, systems and methods capture information about the context of a driver-initiated re-route event to determine why the driver did not follow the prescribed route. This information may be evaluated to determine contextual data surrounding the re-routing event, such as, for example, a reason that caused the driver-initiated re-route event. The system may further evaluate this information to determine whether the re-routing event indicates that other drivers in the vicinity or following a similar route should be rerouted as well. Vehicle and infrastructure sensors or other sources can be used to provide data surrounding the re-routing event to the re-routing context determination system so that the system may determine whether there is a cause for the re-routing that may impact other drivers as well. If so, the system can use this additional context to make a context-based re-routing of other vehicles.

Data from image sensors may be used to evaluate the scene encountered by vehicle that experienced a driver-initiated re-routing event in an attempt to identify the cause of the re-routing. For example, the image information may be used to identify whether there is an obstruction in the road, an accident, a weather event, or whether other adverse road conditions caused the driver to select a different route. Sensor information can also be used to predict clearing time of the issue and information from other vehicles approaching the scene after the subject vehicle can also be used to update the prediction and confirm the clearing. This information can be used to determine how long a context-determined re-routing event continues.

Machine learning can be used to evaluate image information and other sensor information to predict re-routing contexts based on a trained data set and to determine previously unrecognized causes for re-routing. This information can be used to evaluate images and other sensor data in real-time to predict whether a re-routing event may be likely. This information can be used to identify issues in advance of a driver-initiated re-routing event. In some implementations, this may be used to initiate re-routing (e.g., automatically implement re-routing, or suggested re-routing to the vehicle operator) for the vehicle and for other vehicles as well.

The systems and methods disclosed herein may be implemented with any of a number of different vehicles and vehicle types. For example, the systems and methods disclosed herein may be used with automobiles, trucks, motorcycles, recreational vehicles and other like on-or off-road vehicles. In addition, the principals disclosed herein may also extend to other vehicle types as well. An example hybrid electric vehicle (HEV) in which embodiments of the disclosed technology may be implemented is illustrated in FIG. 1. Although the example described with reference to FIG. 1 is a hybrid type of vehicle, the systems and methods for re-routing context determination can be implemented in other types of vehicle including gasoline- or diesel-powered vehicles, fuel-cell vehicles, electric vehicles, or other vehicles.

FIG. 1 illustrates a drive system of a vehicle 102 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

As an HEV, vehicle 2 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 102 relies on the motive force generated at least by internal combustion engine 14, and a clutch 15 may be included to engage engine 14. In the EV travel mode, vehicle 2 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 2 and is powered electrically via a battery 44. Battery 44 may be implemented as one or more batteries or other power storage devices including, for example, lead-acid batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 102 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 102. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 14 (engine RPM), a rotational speed, $N_{MG}$, of the motor 22 (motor rotational speed), and vehicle speed, $N_V$. These may also include torque converter 16 output, $N_T$ (e.g., output amps indicative of motor output), brake operation amount/ pressure, B, battery SOC (i.e., the charged amount for battery 44 detected by an SOC sensor). Accordingly, vehicle 102 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (internal combustion engine 14+MG 12) efficiency, acceleration, $A_{CC}$, etc.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

The example of FIG. 1 is provided for illustration purposes only as examples of vehicle systems with which embodiments of the disclosed technology may be implemented. One of ordinary skill in the art reading this description will understand how the disclosed embodiments can be implemented with vehicle platforms.

Figure 2:
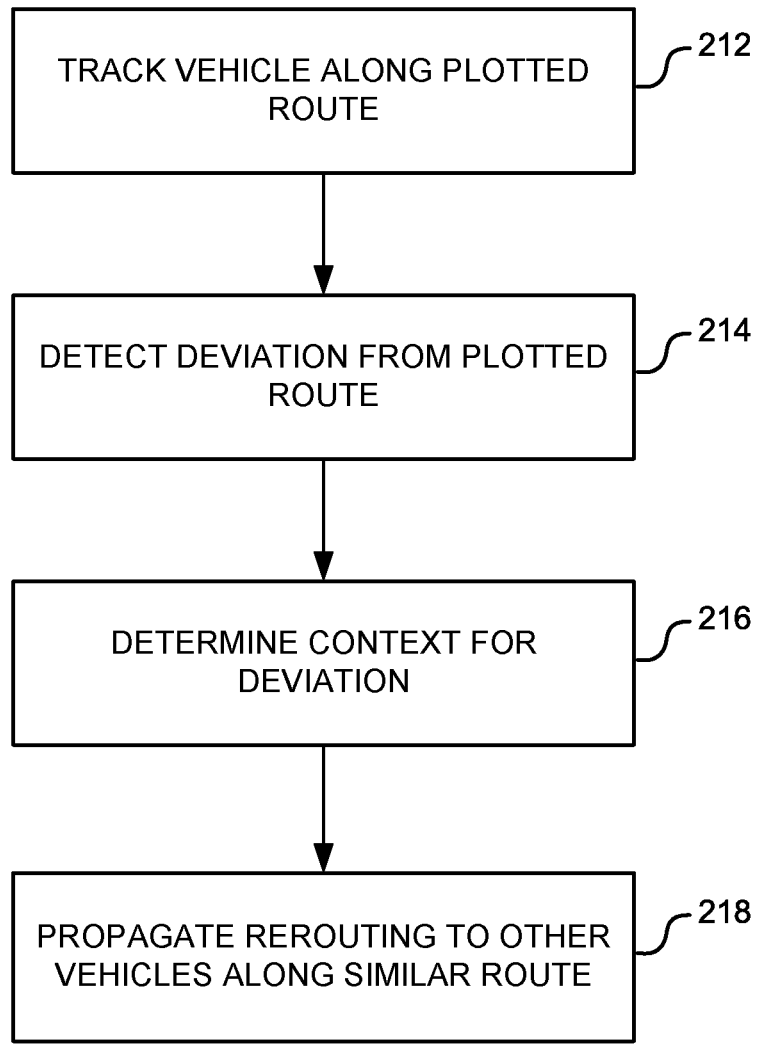
FIG. 2 illustrates an example process for re-routing context determination in accordance with one embodiment of the systems and methods described herein.

FIG. 2 illustrates an example process for re-routing context determination in accordance with one embodiment. FIG. 2 provides a high-level overview of the example process, whereas subsequent figures provide additional detail. Referring now to FIG. 2, at operation 212, a re-routing context determination system tracks the progress of the vehicle as it travels along a prescribed route determined by a navigation system. The re-routing context determination system may be a processor-based device or other circuit local to the vehicle, a remote solution (e.g., cloud server or other server-based solution), a distributed computing function (e.g., shared between the vehicle and a server, shared across multiple vehicles, and so on), or other solution that is able to monitor the vehicle's position and track the vehicle's motion along a plotted route.

If the vehicle operator deviates from the plotted route, the re-routing context determination system detects this deviation. This is illustrated at operation 214. At operation 216, the re-routing context determination system collects and analyzes data that may be relevant to the deviation event and analyzes the data to determine a possible context for the deviation. If the context is unique to the subject vehicle, no further action need be taken. For example, if the system determines that the subject vehicle left the determined route and shortly thereafter stopped at a fueling station or restaurant, the system may infer that the context for the apparent re-routing was unique to the vehicle. As another example, if the subject vehicle proceeds along a scenic route and there was no apparent reason to deviate, the system may infer that the context for the apparent re-routing was a personal choice, again unique to the vehicle. Indeed, there may be any of a number of reasons that may be determined to be vehicle-unique contexts for a re-routing (including an apparent re-routing) event.

If, on the other hand, sensor data or other gather data indicates a situation may have led to the re-routing that may affect other vehicles following the same path, the re-routing context determination system can propagate this information to other vehicles along the same path or approaching the same situation. This is illustrated operation 218. In some embodiments, the re-routing context determination server can plot a new route for the other vehicles so that they can avoid the cause of the driver-initiated re-routing. In other embodiments, the re-routing context determination server can send an alert or other information to the operator or the navigation system of the other vehicles so that appropriate action can be taken. For example, operators of the other vehicles may initiate manual re-routing. As another example, the navigation system may automatically plot new route to avoid the troublesome situation and automatically enter that route or query the user whether the new route should be implemented.

Figure 3:
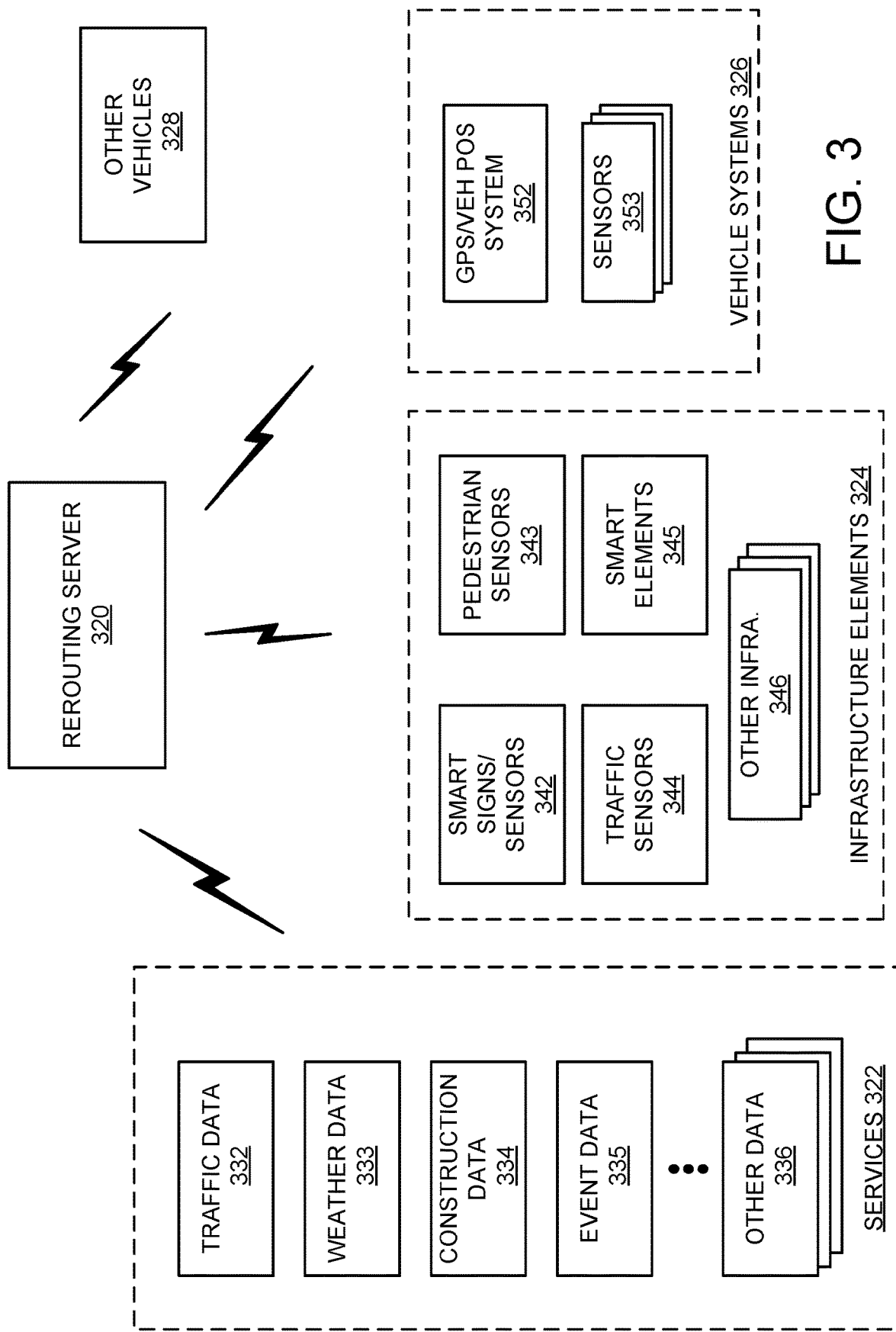
FIG. 3 illustrates an example system for re-routing context determination in accordance with one embodiment of the systems and methods described herein.

With this high level example of the process outlined, an example system is now described. FIG. 3 illustrates an example system for re-routing context determination in accordance with one embodiment. With reference now to FIG. 3, this example system includes a re-routing server 320 that may be communicatively coupled to one or more services 322, infrastructure elements 324, vehicle systems 326 and other vehicles 328.

Data gathered by these various elements may be used by re-routing server 322 identify a deviation from a plotted route, determine a context for a re-routing event, determine whether the context is vehicle specific or may apply to other vehicles (e.g. other vehicles 328) and based on that determination propagate re-routing information to other vehicles 328. As noted above, re-routing server 320 may be a processor-based system or other circuit that is local to the vehicle, it may be a remote server or other processing system (e.g. a cloud server) in communicative contact with the vehicle, it may be a distributed edge-computing system with functionality distributed among multiple vehicles or among one or more vehicles and a remote server, and so on.

In the illustrated example, services 322 that may provide data to re-routing server 324 context determination can include services for traffic data 332, weather data 333, construction data 334, event data 335, and any of a number services to provide other data 336. The services 322 may be third-party services, subscription based services, proprietary or closed services, government or public access services and so on. These services 322 can provide raw or process data to re-routing server 320 depending on the implementation.

Infrastructure elements 324 in this example may include any of a number of infrastructure components or systems such as, for example, smart roadways elements, municipal data gathering elements, and so on. The illustrated example includes smart road signs and sensors 342, pedestrian sensors 343, traffic sensors 344, smart roadways elements 345, and other infrastructure elements 346. These elements may include a variety of sensors or other information gathering instruments or equipment to collect data that can be provided to re-routing server 320 to determine (e.g., predict) a possible context for a driver-initiated re-routing event.

Vehicle systems 326 in this example may include any of a number of vehicle systems or components that might be used by or in conjunction with routing server 320 to enable it to determine a possible context for a driver-initiated re-routing event. This example includes a vehicle positioning system 352 such as, for example, a GPS positioning system; and a plurality of sensors 353.

Other vehicles 328 may also serve as sources of information that may be used by re-routing server 320 to make context determinations for driver initiated re-routing events.

Figure 4:
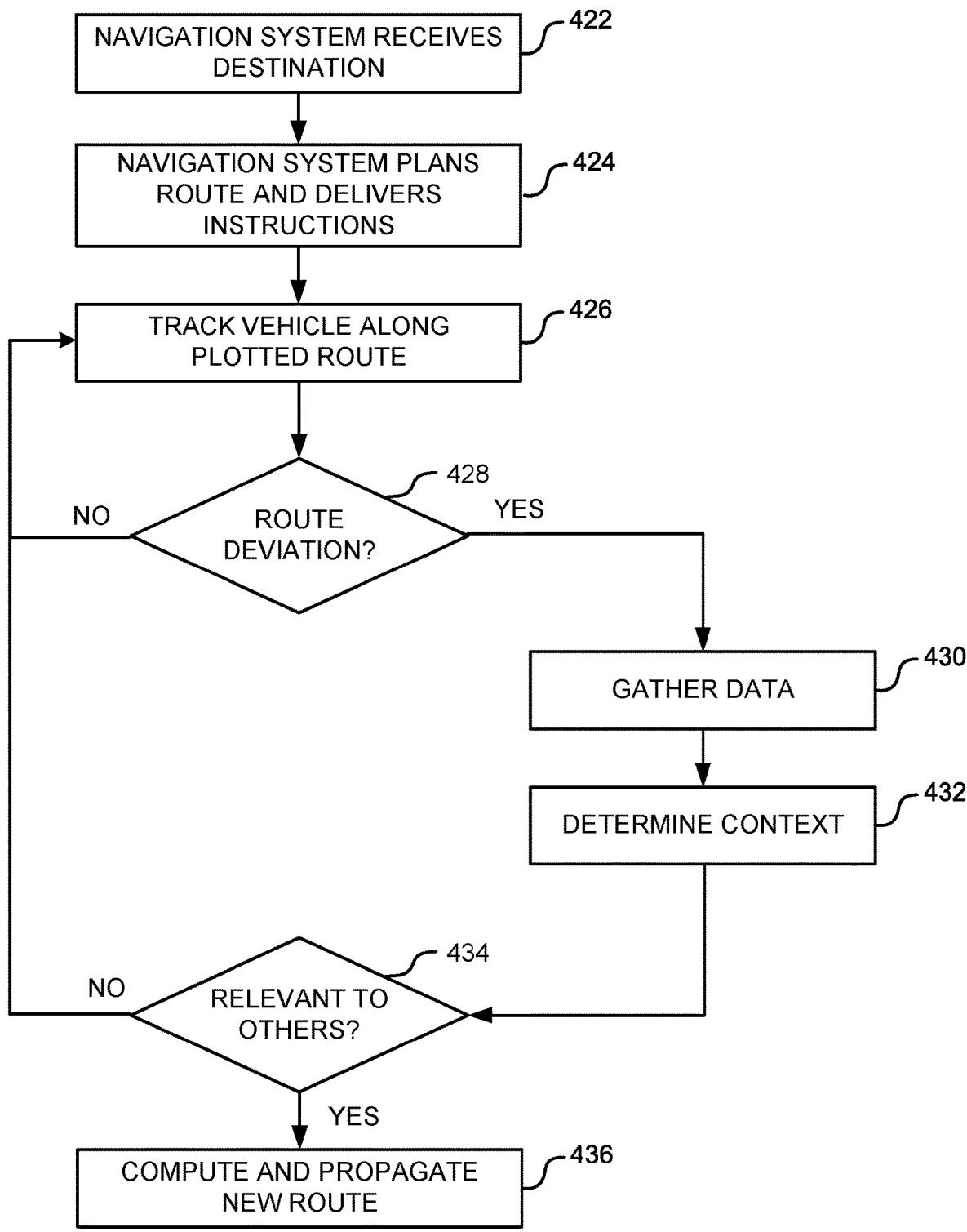
FIG. 4 illustrates another example process for re-routing context determination in accordance with one embodiment of the systems and methods described herein.

FIG. 4 illustrates an example process for re-routing context determination in accordance with one embodiment. The example process of FIG. 4 is described in terms of the example system shown in FIG. 3. However, this process may be used with any of a number of different system architectures and configurations.

With reference now to FIGS. 3 and 4, at operation 422 a vehicle navigation system receives input of a desired destination for the subject vehicle. For example, the user may enter a destination via a user interface using, for example, touchpad, touchscreen or voice inputs. As another example, a vehicle navigation system may receive a destination from another device such as, for example, a vehicle telematics system, a user or passenger smart phone, a remote server, or other destination input mechanism.

At operation 424, the navigation system uses the destination along with the current position of the subject vehicle to plot a route from the current position to the destination. In some embodiments, multiple routes can be plotted such that the system may select the optimal route were such that the user can be permitted to choose from among a plurality of different routes. The navigation system may then enter the selected route and begin providing the vehicle operator instructions regarding following the selected route.

At operation 426, the re-routing context determination system tracks the subject vehicle along the plotted route. For example, an onboard position determination system can continuously or regularly track the current position of the subject vehicle. This can be done, for example, using a GPS, cellular, or other like positioning system. As another example, dead reckoning can be used to track current vehicle position based on information such as direction of travel and speed of operation of the vehicle. The re-routing context determination system can compare the current position against the plotted route to determine whether the vehicle is deviated from the plotted route. In some embodiments, thresholds may be set such that a deviation is not deemed to be a re-routing in less the deviation is for greater than a threshold distance or greater than a threshold duration of time.

Where the current vehicle position conforms to the plotted route, indicating that there is no deviation from the plotted route, the system continues to track the vehicle continuously or periodically to determine whether the vehicle is continuing to follow plotted route or whether the vehicle has deviated from the plotted route. This is illustrated at operation 428. If on the other hand, the system determines that there is a deviation from the plotted route (also at operation 428) the process continues at operation 430 where the re-routing server 320 gathers data from one or more sources to determine the possible context for the driver-initiated re-routing event. For example, data from one or more of services 322, infrastructure elements 324, vehicle systems 326 and other vehicles 328 may indicate a route condition at the location of a re-routing event (or downstream of the re-routing event, or otherwise affecting driving conditions at the re-routing event) that could have led to the re-routing event. This data may be gathered and analyzed to attempt to predict the context, or reason behind, the re-routing event.

For example, traffic data 332 may be evaluated to determine whether unexpected traffic may have caused the driver to deviate from the plotted route. As a further example, traffic data 332 from third-party service provider may be used in conjunction with image data from vehicle cameras (of the subject vehicle or other vehicles 328), sensor data from the subject vehicle or other vehicles 328 (e.g., speed sensors), vehicle speed information from the positioning system 352 of the subject vehicle or other vehicles 328 to determine whether traffic may be the cause of the driver's deviation from the plotted route. Data from infrastructure elements 324 may also be used to indicate the presence of a traffic event.

As another example, data services sources may provide construction data 334 indicating the presence of a construction site at the location of the route deviation, or nearby the location of the route deviation that is causing traffic issues at the point of route deviation. Again, this may be combined with other data from one or more other sources such as, for example, infrastructure elements 324, vehicle systems 326 and other vehicles 328 to determine that construction activity may be the cause of the re-routing event.

As yet another example, event data 335 may provide information regarding community, entertainment, sporting, or other events occurring that may have an effect on traffic, roadway accessibility, lane closures, traffic redirection and so on.

While the above examples illustrate the use of data services to determine a context, it is noted that often times these data services may provide advance warning of situations that might already be considered when the initial route is plotted. In further examples, re-routing server 320 can use information other than information from services 322 to determine a context for a driver initiated re-routing. In other words, embodiments can be implemented such that context determination can be performed on the fly, to determine a previously unrecognized route condition providing context for a re-routing event.

For example, when a driver-initiated re-routing event is detected, the system may gather information from image sensors or other vehicle or infrastructure sensors and analyze that information to determine a context for the re-routing event. For example, image data may be analyzed to determine road conditions, traffic conditions, or other information that may identify a context for the re-routing event. As another example information obtained using data from multiple sensors may be to assist in the determination. For example, data from one or more of vehicle speed sensors, accelerometers, brake application sensors, image sensors, whether sensors and others may be analyzed to determine whether there is traffic congestion, a higher than expected pedestrian traffic level, poor road conditions, a construction zone, adverse weather conditions, to name a few.

In various embodiments, the sensor data can be data collected from infrastructure sensors only, onboard vehicle sensors only, sensors from other vehicles or any combination of the foregoing.

Returning again to FIG. 4, at operation 434 re-routing server 320 determines whether a context that gave rise to the re-routing event may be relevant to other vehicles following the same route, following the same segment of the route, in the same vicinity as the subject vehicle, or otherwise may be affected by the event that gave rise to re-routing the subject vehicle. As indicated above, there may be several re-routing contexts that are unique to the subject vehicle and would not have an impact on other vehicles (e.g. other vehicles 328). For example, sensor data (including image information) and data from the position determination system may indicate that the subject vehicle left the plotted route and shortly thereafter stopped at an establishment such as a fueling station, eating establishment, convenience store, rest area, or other location indicating an intention specific to that vehicle. Examination of other data such as, for example, image information, other vehicle sensor data, data from services 322, and so on may confirm that there does not appear to be any other circumstances that gave rise to the deviation. Accordingly, re-routing server 320 may determine at operation 434 that the context for the deviation is not relevant to other vehicles. In this situation, a new route may be calculated (on board the subject vehicle, or remotely, or in a distributed fashion), the new route loaded in the system may continue to track the vehicle along the new plotted route at operation 426.

In contrast, sensor data may indicate a situation that could be relevant to other vehicles. For example, a vehicle speed sensor may indicate an abrupt stopping of forward motion of the vehicle, accelerometers may indicate a drastic downward pitch of the front end of the vehicle, image information may indicate unexpected road obstructions (e.g., fallen rocks or trees blocking the roadway, a previously unreported accident blocking the roadway, or other unexpected or otherwise unknown event). This information may indicate that the road is presently on passable and, therefore, it would be appropriate to reroute other vehicles as well to avoid that closed road.

Accordingly, at operation 436 the system computes and propagates a new route to other vehicles 328 for which it may be appropriate for re-routing. In some embodiments, different updated reroutes may be plotted for different vehicles depending on current vehicle locations and vehicle destinations. Accordingly, re-routing server 320 may consider the current position of the vehicle, its intended destination and user preferences and plot a route for that particular vehicle using this information. This can be done on board the vehicle (e.g., communicating the event to the vehicle and letting the vehicles own navigation system plot new route), by the subject vehicle, by a cloud server or other remote system, or in a distributed manner.

In various embodiments, artificial intelligence and machine learning techniques can be used to predict a reason for a re-routing event based on trained models. Sensor data, services data and other data collected over a large number of occurrences can be evaluated against actual or verified information to train and to refine the model. The model can be used to determine previously unrecognized reasons for rerouting based on data gathered by entities such as vehicles, infrastructure elements and services.

Some embodiments disclosed are described in terms of the subject vehicle that deviated from a plotted route communicating with a remote processing system for rerouting context determination. Such a vehicle may be referred to as a connected vehicle as it is connected with one or more of a remote server, other vehicles, and infrastructure elements. In other embodiments, detection of a rerouting event may be based on deviation of one or more un-connected vehicles from a plotted route (e.g., vehicles not connected to a remote server or to other vehicles, or both). In such embodiments, other factors may be used to determine deviation of one or more non-connected vehicles from a plotted route.

Figure 5:
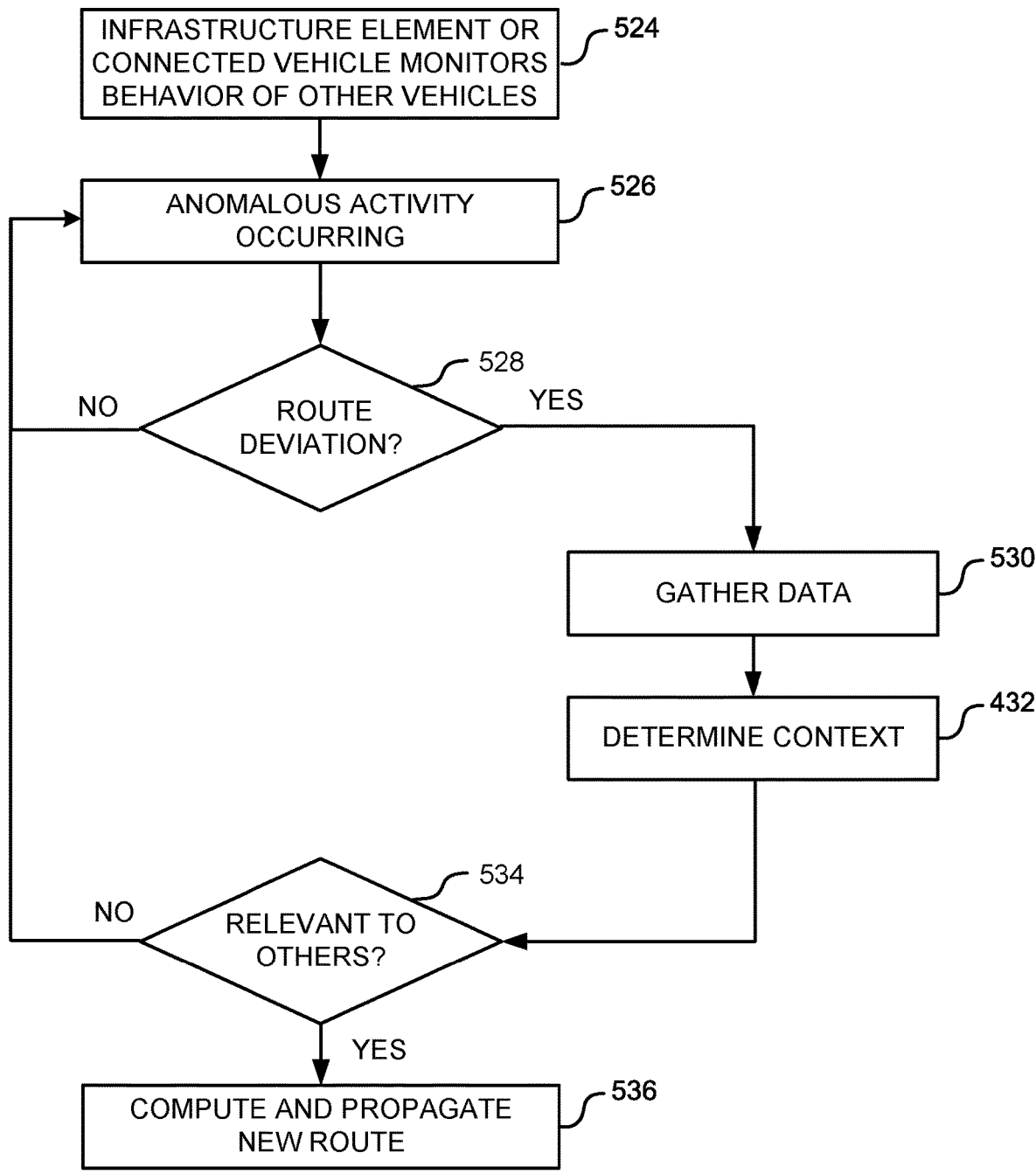
FIG. 5 illustrates an example of rerouting context determination based on deviation of one or more unconnected vehicles in accordance with one embodiment systems and methods disclosed herein.

FIG. 5 illustrates an example of rerouting context determination based on deviation of one or more unconnected vehicles in accordance with one embodiment systems and methods disclosed herein. With reference now to FIG. 5, at operation 524 system components monitor the operation of one or more vehicles traveling along a roadway. For example, monitoring vehicles may use sensors to gather data on one or more monitored vehicles in this data can be shared with a rerouting system (e.g., rerouting server 320) by the one or more monitoring vehicles. Other sensors, such as those included with infrastructure elements for example, can also monitor the monitored vehicles and report data to a rerouting system.

At operation 526, the rerouting system (e.g., cloud-based system edge-computing solution, local one-board processing system, or otherwise) can evaluate the data obtained by sensors of the monitoring vehicles and other sensors to determine whether an anomalous activity is occurring it may indicate a route deviation. For example, sensors may detect that an unusually large number of vehicles are exiting at a particular exit from the freeway. This anomalous route activity may indicate that there is a problem or other situation on the freeway causing motorists to deviate from their originally intended route.

Threshold detectors or other comparison mechanisms can be used to determine whether a certain behavior (e.g., number of vehicles using a particular exit, number of vehicles turning off of a primary thoroughfare, number of U-turns at a given location, and so on) indicates an issue causing a route deviation. As a further example, the system may collect historic data and compare received current data regarding monitored vehicles with the collected historic data to determine whether the current data indicates behavior that is above or below average, and if so by how much. For example, occurrences of an event more than 10%, 15%, 20%, 25%, 30%, 35%, 40%, 45%, 50% or other determined percentage above average may indicate anomalous route activity. As another example, behavior in the first, second, third, or fourth (or other) decile as compared to historic data may indicate anomalous route activity.

As another example, erratic or unusual behavior such as sharp braking and rapid lane changes to reach an exit or turn off in time may also indicate anomalous route activity is occurring. Artificial intelligence algorithms may be used to train a model that can predict whether detected behavior is anomalous route activity that is occurring. This prediction may be accomplished in terms of a likelihood prediction.

At operation 528, if the system determines that the detected activity is not indicative of a route deviation the system continues to monitor captured data to predict whether one or more monitored vehicles are continuing to follow intended routes or whether one or more monitored vehicles appears to have deviated from the plotted route. If on the other hand, the system determines that there is a deviation from the plotted route (also at operation 528) the process continues at operation 530 where the system gathers data from one or more sources (e.g., other vehicles, infrastructure elements, service providers, and so on) to determine the possible context for the driver-initiated re-routing event. For example, data from one or more of services 322, infrastructure elements 324, vehicle systems 326 and other vehicles 328 may indicate a route condition at the location of a likely re-routing event that could have led to the re-routing. Accordingly, a context prediction can be made by combining information about unconnected vehicles (e.g., as captured by sensors from monitoring vehicles or infrastructure elements) with information from connected vehicles and other sources. Combining information from various data sources to arrive at a context prediction may yield a higher accuracy. This data may be gathered and analyzed to attempt to predict the context, or reason behind, the re-routing event.

If the context surrounding the rerouting event is relevant to other operators (operation 534), the system may compute a new route and propagate that new route to other vehicles in the area who may otherwise encounter the same issue. This is illustrated operation 536. On the other hand, if the context surrounding the rerouting event is not relevant to other operators (also at operation 534), the system continues to monitor captured data to predict whether one or more monitored vehicles are continuing to follow intended routes or whether one or more monitored vehicles appears to have deviated from the plotted route.

In various embodiments disclosed herein a rerouting context determination system can inform connected as well as unconnected vehicles. In the examples discussed with reference to FIGS. 4 and 5, new routes are propagated to connected vehicles such as via a 5G or LTE or other data connection. However, route information can be provided to connected and unconnected vehicles as well via means other than a wireless data connection. For example, new routing information may be communicated to vehicle operators (connected and unconnected alike) by updating smart billboards, road signs and other like driver aids. As another example, new routing information may be propagated by text message, cellular data or other service to portable electronic devices that may be carried by operators or passengers of connected and unconnected vehicles.

In yet another example, a group of vehicles in which one or more of those vehicles are not connected with a server may connect with one another to collaboratively make a rerouting context determination. For example, if one of those vehicles changes its route from a planned route, that vehicle may send a message to nearby vehicles (e.g., vehicles in an ad hoc group) that it is changing. Vehicles in the group may share sensor data and other information with one another to predict a context for the rerouting decision. If the context indicates that a route deviation is of interest to other vehicles in the area, the rerouting can be shared amongst the group and broadcast to vehicles outside the group. This ad hoc rerouting context determination can be made in various embodiments without access to a server-based solution external to the vehicles.

Figure 6:
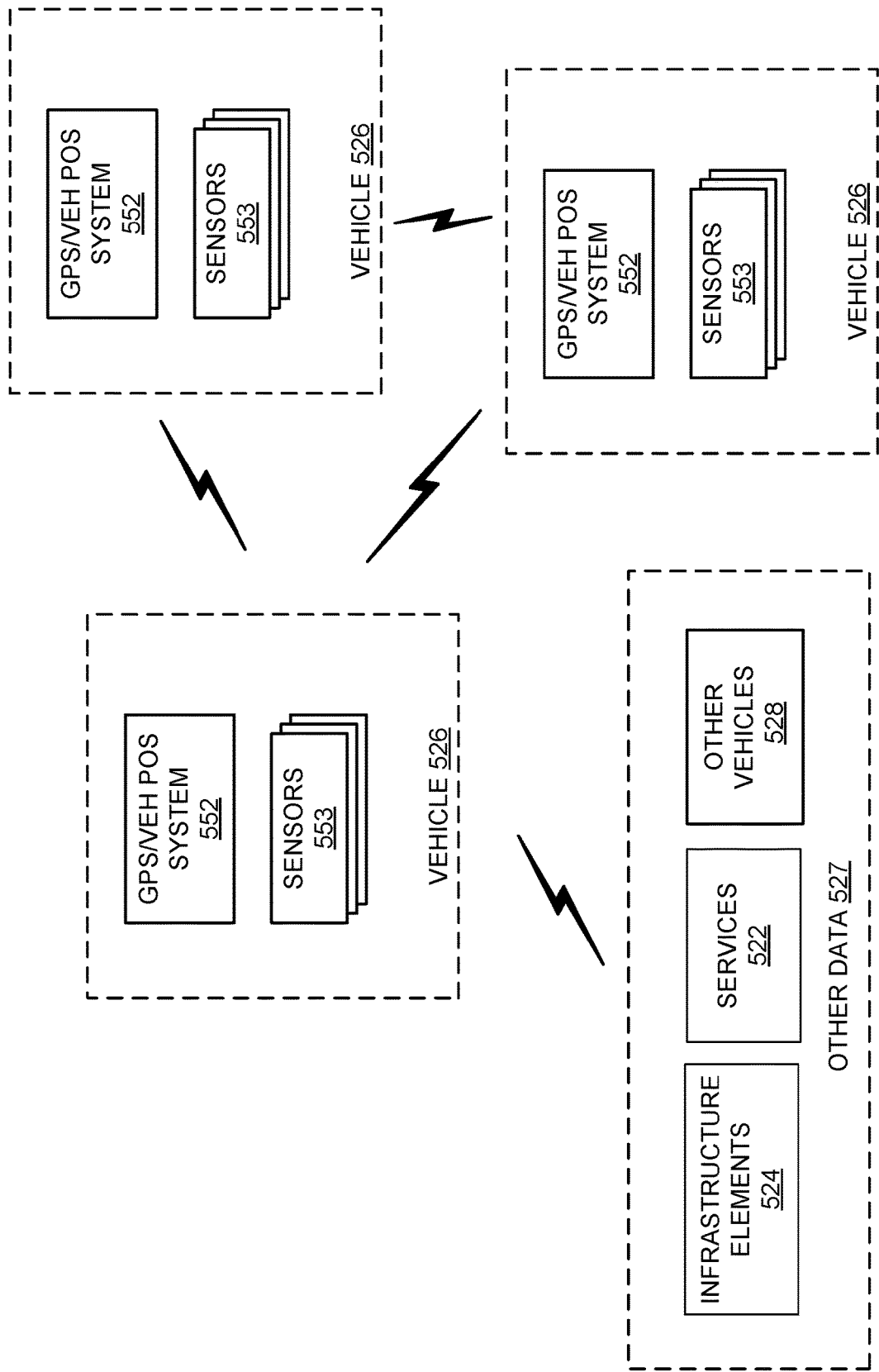
FIG. 6 illustrates an example of ad hoc rerouting context determination among a group of vehicles in accordance with one embodiment of the systems and methods disclosed herein.

FIG. 6 illustrates an example of ad hoc rerouting context determination among a group of vehicles in accordance with one embodiment of the systems and methods disclosed herein. In this example, three vehicles 526 make up the group. In other embodiments, other quantities of vehicles can make up the group. The group size and makeup of this ad hoc group may vary in real time as different vehicles come into and out of communication range with the group. As illustrated, vehicles 526 are in communicative contact with each other. They may each be in direct contact with one another or some may be in contact with fewer than all of the vehicles in the group.

One or more of vehicles 526 in the ad hoc group may also be in communication with other data sources 527. These other data sources 527 may be used to provide data that can be helpful in predicting a context for a rerouting event. Similar to the example illustrated in FIG. 3, the sources can include infrastructure elements 524, other vehicles 528, and information services 522. Also similar to the example of FIG. 3, in this example vehicles 526 may include a positioning system 552 and one or more sensors 553.

Figure 7:
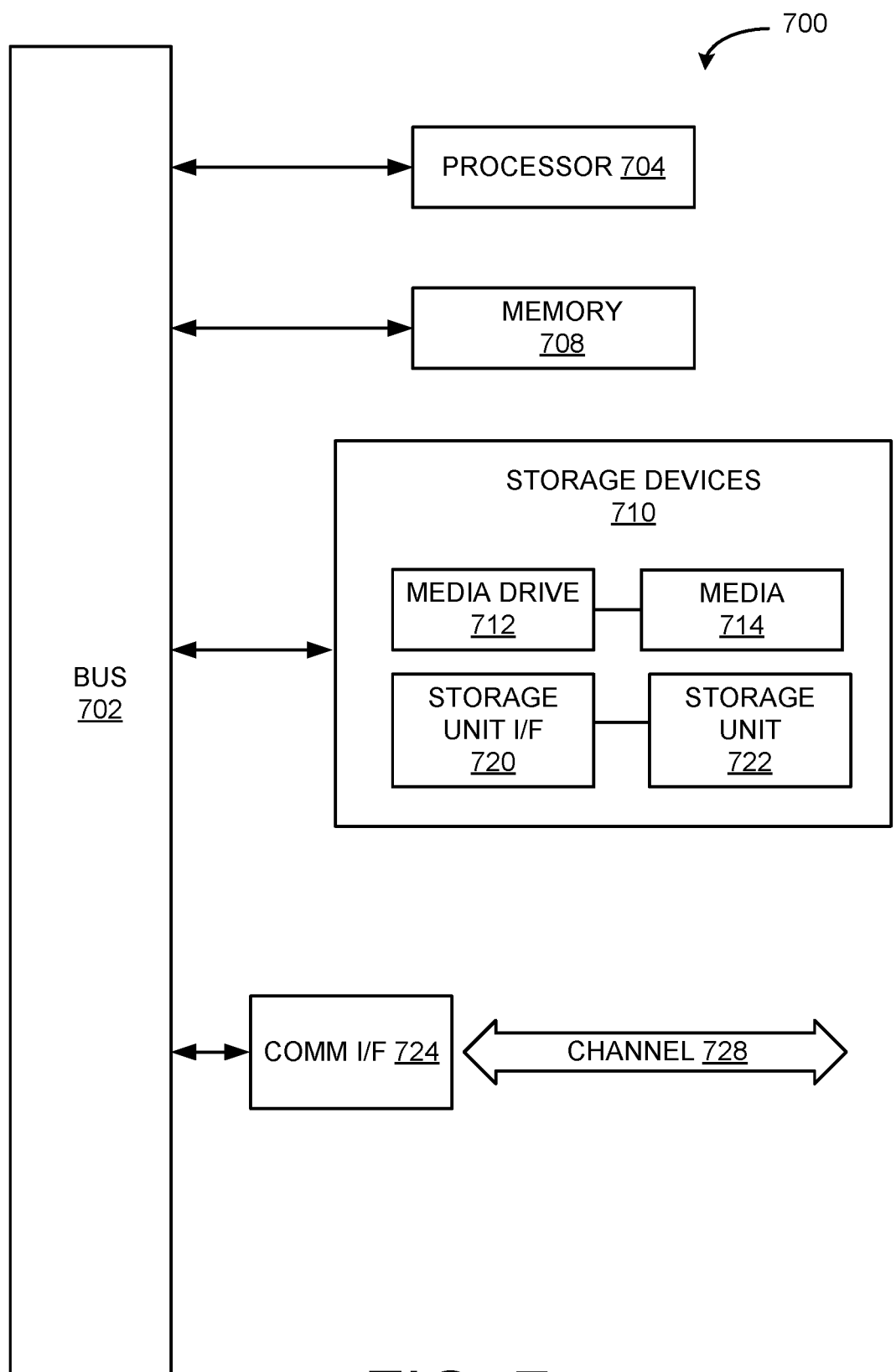
FIG. 7 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 7. Various embodiments are described in terms of this example-computing component 500. After reading this description, it will become apparent to a person skilled in the relevant art how to implement the application using other computing components or architectures.

Referring now to FIG. 7, computing component 700 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 700 might also represent computing capabilities embedded within or otherwise available to a given device. For example, a computing component might be found in other electronic devices such as, for example, portable computing devices, and other electronic devices that might include some form of processing capability.

Computing component 700 might include, for example, one or more processors, controllers, control components, or other processing devices. Processor 704 might be implemented using a general-purpose or special-purpose processing engine such as, for example, a microprocessor, controller, or other control logic. Processor 704 may be connected to a bus 702. However, any communication medium can be used to facilitate interaction with other components of computing component 700 or to communicate externally.

Computing component 700 might also include one or more memory components, simply referred to herein as main memory 708. For example, random access memory (RAM) or other dynamic memory, might be used for storing information and instructions to be executed by processor 704. Main memory 708 might also be used for storing temporary variables or other intermediate information during execution of instructions to be executed by processor 704. Computing component 700 might likewise include a read only memory ("ROM") or other static storage device coupled to bus 702 for storing static information and instructions for processor 704.

The computing component 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a solid-state drive, a magnetic tape drive, an optical drive, a compact disc (CD) or digital video disc (DVD) drive (R or RW), or other removable or fixed media drive might be provided. Storage media 714 might include, for example, a hard disk, an integrated circuit assembly, magnetic tape, cartridge, optical disk, a CD or DVD. Storage media 714 may be any other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing component 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory component) and memory slot. Other examples may include a PCMCIA slot and card, and other fixed or removable storage units 722 and interfaces 720 that allow software and data to be transferred from storage unit 722 to computing component 700.

Computing component 700 might also include a communications interface 724. Communications interface 724 might be used to allow software and data to be transferred between computing component 700 and external devices. Examples of communications interface 724 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 724 may be carried on signals, which can be electronic, electromagnetic (which includes optical) or other signals capable of being exchanged by a given communications interface 724. These signals might be provided to communications interface 724 via a channel 728. Channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 700 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard,"

"known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for re-routing context determination for a subject vehicle using a processor configured with at least one of a remote server and a distributed computing function, comprising:
   receiving a plurality of sensor data and tracking movement of the subject vehicle as the subject vehicle is following a planned route using the plurality of sensor data;
   determining whether a deviation of the subject vehicle from the planned route indicates a user-initiated re-routing of the subject vehicle from the planned route based on trends from the sensor data;
   receiving additional data from a plurality of sources indicating a route condition leading to the user-initiated re-routing, the additional data including at least one of traffic data, weather data, construction data, and event data;
   analyzing the received additional data to determine a previously unrecognized route condition as causing the user-initiated re-routing;
   based on the previously unrecognized route condition determined as causing the user-initiated re-routing, determining whether to reroute other vehicles to avoid the previously unrecognized route condition and communicating rerouting instructions to a vehicle of the other vehicles, wherein the subject vehicle is in communication with a remote server, the other vehicles, and infrastructure elements; and
   adjusting a plurality of navigational systems automatically, wherein each navigation system corresponds to the subject vehicle or one of the other vehicles.

2. The method of claim 1, further comprising analyzing some or all of the received data by applying sensor information to a trained data set to predict a clearing time of a route condition that is determined to have given rise to the user-initiated re-routing event.

3. The method of claim 1, wherein analyzing the received data to determine a context for the user-initiated re-routing, comprises predicting a re-routing reason based on a trained data set.

4. The method of claim 1, further comprising using artificial intelligence to determine previously unrecognized re-routing reasons based on gathered data.

5. The method of claim 1, wherein the sources of gathered data comprise at least one of services, infrastructure elements, vehicle systems and other vehicles.

6. The method of claim 1, wherein receiving data is performed only if the deviation of the subject vehicle from the planned route is a re-routing event.

7. The method of claim 1, wherein determining whether the deviation of the subject vehicle from the planned route indicates a user-initiated re-routing of the subject vehicle from the planned route is performed by at least one of the subject vehicle and a server remote from the vehicle.

8. The method of claim 1, wherein determining the previously unrecognized route condition causing the user-initiated re-routing is performed by the server remote from the vehicle.

9. The method of claim 1, wherein the subject vehicle is not connected to a remote server and wherein determining whether the deviation of the subject vehicle from the planned route indicates a user-initiated re-routing of the subject vehicle from the planned route is performed by one or more connected vehicles connected to a remote server to determine a likelihood that the deviation is a user-initiated re-routing.

10. The method of claim 1, wherein determining a likelihood that the deviation is a user initiated re-routing comprises determining whether route activity of a subject vehicle is anomalous route activity.

11. A rerouting system, comprising:
   a processor configured with at least one of a remote server, or distributed computing function; and
   a memory coupled to the processor to store instructions, which comprises computer code that when executed by the processor, causes the processor to perform operations, the operations comprising:
      receiving a plurality of sensor data and tracking movement of a subject vehicle as the subject vehicle is following a planned route with a plurality of sensor data;
      determining whether a deviation of the subject vehicle from the planned route indicates a user-initiated re-routing of the subject vehicle from the planned route based on trends from the sensor data;
      receiving additional data from a plurality of sources indicating a route condition leading to the user-initiated re-routing, the additional data including at least one of traffic data, weather data, construction data, and event data;
      analyzing the received data to determine a previously unrecognized route condition as causing for the user-initiated re-routing;
      based on the previously unrecognized route condition, determining whether to reroute other vehicles to avoid the previously unrecognized route condition and communicating rerouting instructions to a vehicle of the other vehicles, wherein the subject vehicle is in communication with a remote server, the other vehicles, and infrastructure elements; and adjusting a plurality of navigational systems automatically, wherein each navigation system corresponds to the subject vehicle or one of the other vehicles.

12. The system of claim 11, further configured to perform operations comprising analyzing some or all of the received data to predict a clearing time of a route condition that is determined to have given rise to the user-initiated re-routing event.

13. The system of claim 11, wherein analyzing the received data to determine a reason for the user-initiated re-routing, comprises predicting a re-routing reason based on a trained data set.

14. The system of claim 11, further configured to perform operations comprising using artificial intelligence to determine previously unrecognized re-routing reasons based on the received data.

15. The system of claim 11, wherein the sources of received data comprise at least one of services, infrastructure elements, vehicle systems and other vehicles.

16. The system of claim 11, wherein receiving additional data is performed only if the deviation of the subject vehicle from the planned route is a re-routing event.

17. A rerouting system to determine a rerouting reason for a subject vehicle, comprising:
   a monitoring vehicle, configured with at least one of a processor, remote server, or distributed computing function, tracking movement of the subject vehicle as the subject vehicle is following a route;
   the monitoring vehicle determining whether a change in routing indicates a user-initiated re-routing of the subject vehicle from a planned route;
   a rerouting server gathering data from a plurality of sources indicating a previously unrecognized route condition leading to the user-initiated re-routing, including at least one of traffic data, weather data, construction data, and event data;
   analyzing the gathered data to determine that the previously unrecognized route condition is a cause of the user-initiated rerouting;
   based on the previously unrecognized route condition, determining whether to reroute other vehicles to avoid the previously unrecognized route condition, wherein the other vehicles are connected; and
   adjusting a plurality of navigational systems automatically, wherein each navigation system corresponds to the monitoring vehicle or one of the other vehicles.

18. The system of claim 17, wherein determining whether a change in routing indicates a user initiated rerouting of the subject vehicle from a planned route comprises the monitoring vehicle evaluating sensor data to determine a likelihood that the change in routing is an anomalous route activity.

19. A method for rerouting determination among a plurality of vehicles in communication with one another, comprising:
   a first vehicle of the plurality of vehicles, configured with at least one of a processor, remote server, or distributed computing function, sending a notification to at least one of the other vehicles of the plurality of the vehicles that the first vehicle is deviating from a planned route;
   the other vehicles of the plurality of vehicles receiving additional data from a plurality of sources indicating a previously unrecognized route condition, the additional data including at least one of traffic data, weather data, construction data, and event data, and analyzing the received data to determine that the previously unrecognized route condition is a cause of the first vehicle's deviation;
   the other vehicles, based on the previously unrecognized route condition, determining whether to reroute themselves to avoid the previously unrecognized route condition and communicating rerouting instructions to a vehicle of the other vehicles; and
   the other vehicles of the plurality of vehicles adjusting a plurality of navigational systems automatically, wherein each navigation system corresponds to one vehicle of the plurality of vehicles.

20. The method of claim 19, wherein the data received from the plurality of sources comprises at least one of data gathered from sensors onboard the other vehicles, services and infrastructure elements.

21. A system for rerouting determination among a plurality of vehicles in communication with one another, comprising:
   a plurality of vehicles, wherein at least one of the vehicles is configured with at least one of a processor, remote server, or distributed computing function;
   the plurality of vehicles receiving a notification from a subject vehicle indicating that the subject vehicle is deviating from a planned route;
   the plurality of vehicles receiving additional data from a plurality of sources indicating a previously unrecognized route condition, the additional data including at least one of traffic data, weather data, construction data, and event data, and analyzing the received data to determine that the previously unrecognized route condition is a cause of the first vehicle's deviation;
   the plurality of vehicles other than the subject vehicle, based on the previously unrecognized route condition, determining whether to reroute themselves to avoid the previously unrecognized route condition and communicating rerouting instructions to a vehicle of the other vehicles; and
   the other vehicles adjusting a plurality of navigational systems automatically, wherein each navigation system corresponds to one vehicle of the plurality of vehicles.

* * * * *